United States Patent
Wu et al.

(10) Patent No.: US 7,827,150 B1
(45) Date of Patent: Nov. 2, 2010

(54) APPLICATION AWARE STORAGE APPLIANCE ARCHIVING

(75) Inventors: Weibao Wu, Vadnais Heights, MN (US); Kent Cheng, Woodbury, MN (US)

(73) Assignee: Symantec Corporation, Mountain View, CA (US)

( * ) Notice: Subject to any disclaimer, the term of this patent is extended or adjusted under 35 U.S.C. 154(b) by 308 days.

(21) Appl. No.: 11/799,506

(22) Filed: Apr. 30, 2007

(51) Int. Cl.
*G06F 17/30* (2006.01)
(52) U.S. Cl. .................... 707/674; 707/675; 707/676; 707/679; 707/671; 707/672
(58) Field of Classification Search ........................ None
See application file for complete search history.

(56) References Cited

U.S. PATENT DOCUMENTS

| | | | |
|---|---|---|---|
| 5,812,398 A | 9/1998 | Nielsen | |
| 6,134,660 A * | 10/2000 | Boneh et al. | 713/193 |
| 7,003,551 B2 | 2/2006 | Malik | |
| 7,165,082 B1 | 1/2007 | DeVos | |
| 7,200,604 B2 | 4/2007 | Forman et al. | |
| 7,251,680 B2 | 7/2007 | DeVos | |
| 2002/0120678 A1 | 8/2002 | Jones et al. | |

* cited by examiner

*Primary Examiner*—Baoquoc To
(74) *Attorney, Agent, or Firm*—Rory D. Rankin; Meyertons, Hood, Kivlin, Kowert & Goetzel, P.C.

(57) ABSTRACT

Various embodiments of a computer system and methods are disclosed. In one embodiment, a computer system includes a host coupled to a backup store. The host backs up a dataset to the backup store. The dataset comprises data entities and application-specific metadata describing the data entities. The application-specific metadata enables an application to use the data entities. The host: mounts the backup store for read/write access by the application, accesses the backup store with the application, selects a data entity, and performs an operation on the data entity in the backup store using the application. The operation may comprise verifying that the data entity is valid and usable in the context of the application or creating an archival backup of the data entity on a backup medium. The backup store may be a disk-based backup store and the backup medium may be a tape-based backup medium.

20 Claims, 12 Drawing Sheets

APPLICATION AWARE STORAGE APPLIANCE ARCHIVING

BACKGROUND OF THE INVENTION

1. Field of the Invention

This invention relates to computer systems and, more particularly, to backup and restoration of data within computer systems.

2. Description of the Related Art

There is an increasing need for organizations to protect data that resides on a variety of client devices via some type of backup mechanism. For example, numerous client devices may be coupled to a network to which one or more media servers are also coupled. The media servers may include or be further coupled to a storage unit consisting of one or more disk storage devices, tape drives, or other backup media. Media servers and backup media may provide low-cost, long-term archival storage of data. A backup agent on each client device may convey data files to the media server for storage according to a variety of schedules, policies, etc. For example, large backup datasets may be moved from a client device to a media server configured to store data for later retrieval, thereby protecting data from loss due to user error, system failure, outages, and disasters, etc. as well as archiving information for regulatory compliance, workflow tracking, etc.

Unfortunately, data stored on archival backup media may not be readily available to the client devices. For example, restoration of data may require an administrator to locate and mount a tape, drive, or other device, before the data may be accessed. Consequently, client devices may backup and restore data in a disk-based backup store via one or more host devices coupled to the network in addition to archival storage on backup media. In some cases, single-instance storage techniques may be used in which datasets are segmented and the segments are de-duplicated to reduce the required disk capacity. Conventional archival techniques and single-instance techniques may be mixed in the same backup environment.

In order to make data more readily available, one or more metadata managers may store metadata in a catalog, the metadata describing the associated data in the backup store. Such a catalog may be referred to as a metabase. Metadata managers may be located on separate hosts or co-located on hosts that include a backup store. Accordingly, one or more metabases hosted in a variety of locations may contain data describing a backup store.

To facilitate finding data entities that are stored in a backup store, file system user interfaces may be provided on client devices. For example, files in a backup store may be read through interfaces that provide some of the capabilities of Network File System (NFS) or Common Internet File System (CIFS). Unfortunately, these interfaces do not provide the ability to write to, modify, or create multiple versions of files in a backup store. It may be desirable to perform a variety of operations on data that is stored in a backup store. For example, after a backup, it may be desirable to verify the correctness and usability of files in a backup store. Unfortunately, without write access to the backup store, finding and correcting errors requires the files to be restored first, a costly and time-consuming operation.

In addition to the above considerations, it is sometimes desirable to move backup data from a disk-based backup store to an archival backup medium. For example, data may be stored in a backup store on a frequent basis using single-instance techniques so that it is readily available to recover from inadvertent deletion. The same data may be moved to a backup archive for regulatory compliance on a less frequent basis. While it is possible to create an archival backup copy of a complete data image from a backup store, application-specific metadata used to interpret stored data in the context of its original application may be lost in the process.

In view of the above, an effective system and method for allowing an application to perform a variety of operations on backup data stored in a backup store that accounts for these issues is desired.

SUMMARY OF THE INVENTION

Various embodiments of a computer system and methods are disclosed. In one embodiment, a computer system includes a host coupled to a backup store. The host is configured to backup a dataset to the backup store. The dataset comprises data entities and application-specific metadata describing the data entities. The application-specific metadata enables an application to use the data entities. The host is further configured to: mount the backup store for read/write access by the application, access the backup store with the application, select a data entity, and perform an operation on the data entity in the backup store using the application.

In one embodiment, the operation comprises verifying that the data entity is valid and usable in the context of the application. In another embodiment, the operation comprises creating an archival backup of the data entity on a backup medium. In a further embodiment, the backup store is a disk-based backup store and the backup medium is a tape-based backup medium. In a still further embodiment, the backup store is configured to store data objects and data segments, wherein each data object corresponds to a data entity and references the data segments. The backup store is further configured to de-duplicate the data segments against previously stored data segments prior to storing them.

In a still further embodiment, the system includes a catalog configured to store metadata describing the plurality of data entities. The host is further configured to access the backup store through a virtual file system interface. The virtual file system interface is configured to use metadata from the catalog to enable the application to write data to data objects in the backup store. The application-specific metadata may be different from the metadata stored in the catalog.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
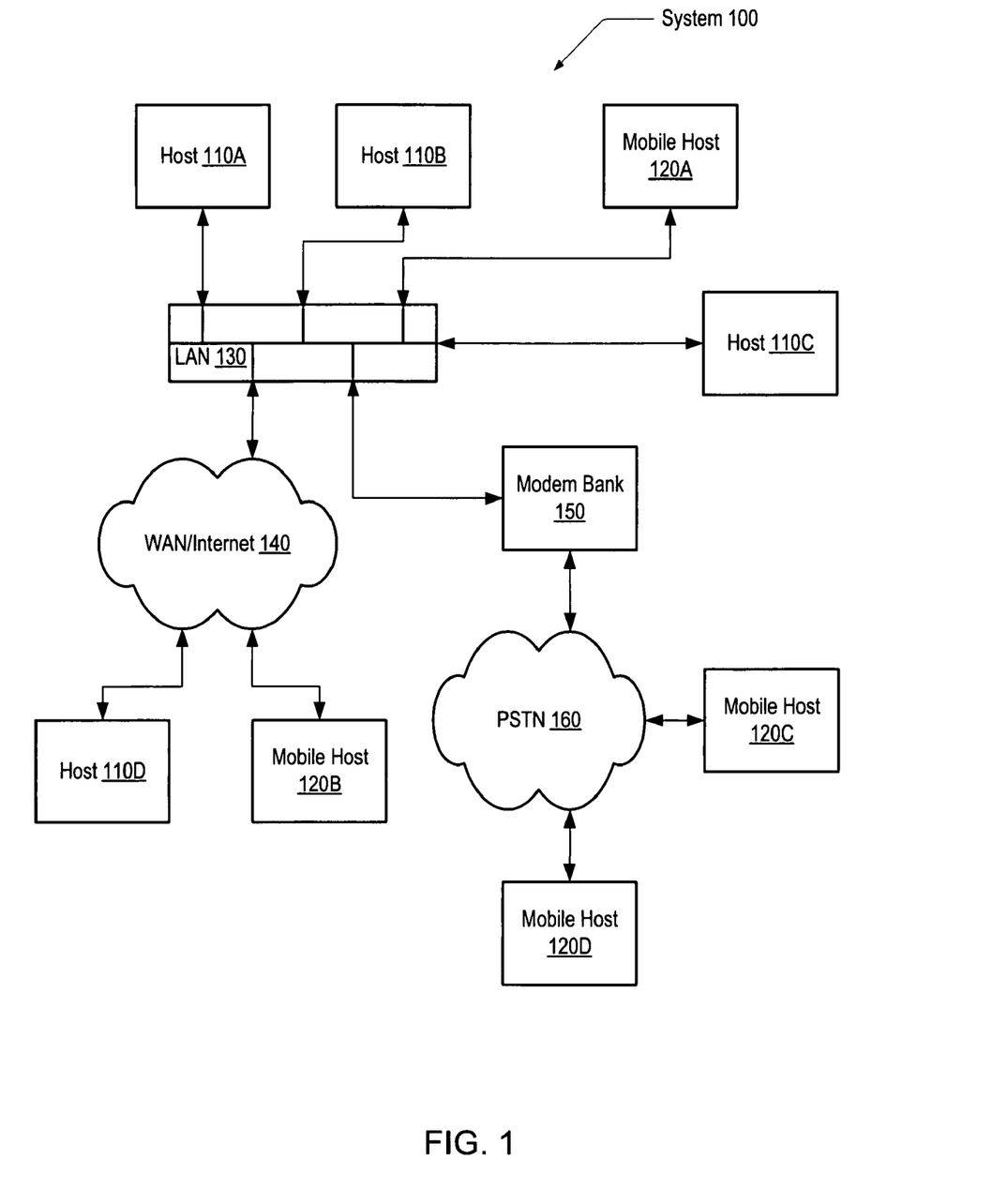
FIG. 1 illustrates one embodiment of a computer system.

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which is in turn coupled to a public switched telephone network (PSTN) 160. Hosts 110A-110D are representative of any number of stationary computers. Mobile hosts 120A-120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
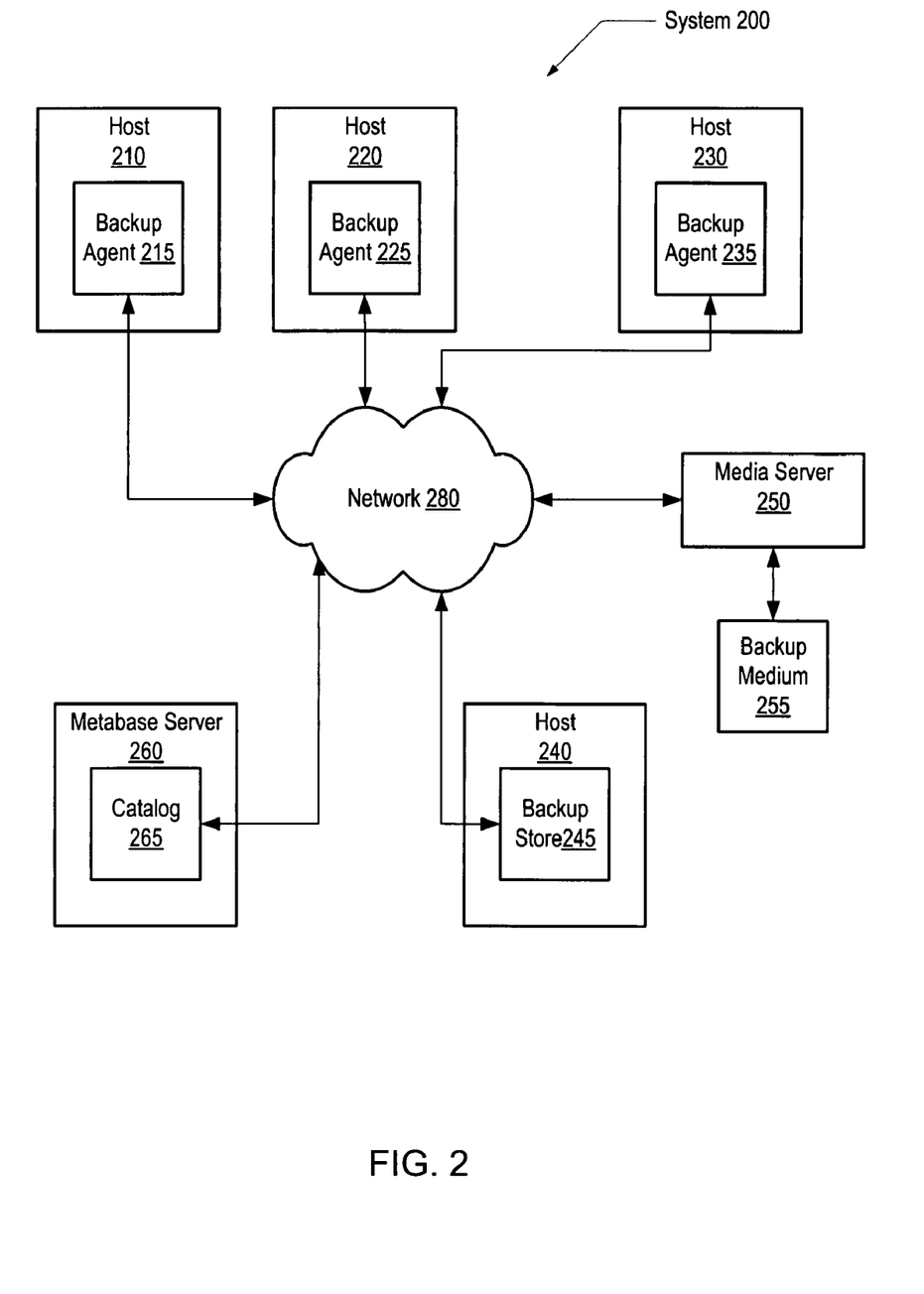
FIG. 2 is a generalized block diagram of one embodiment of a backup system that may operate within a computer system.

Within system 100, it may be desired to protect data associated with any of hosts 110A-110D and mobile hosts 120A-120D. In order to protect host-associated data, various backup components may operate on hosts 110A-110D and mobile hosts 120A-120D. Turning now to FIG. 2, a generalized block diagram of one embodiment of a backup system 200 that may operate within system 100 is shown. System 200 includes hosts 210, 220, 230, and 240 coupled through network 280 to a media server 250 and a metabase server 260. Backup agents 215, 225, and 235 operate on hosts 210, 220, and 230, respectively. In the illustrated embodiment, media server 250 is further coupled to a backup medium 255 in which a copy of data from one or more hosts may be stored. In one embodiment, backup medium 255 may be part of or included in backup server 250. Hosts 240 may include a backup store 245, in which a copy of data from one or more hosts may also be stored. In one embodiment, backup store 245 may store data using single-instance storage techniques. Metabase server 260 includes a catalog 265 on which may be stored metadata describing the data stored in backup store 245. Additional metabases may be included in system 200 in alternative embodiments. Additional backup data may also be included in system 200, depending on the storage requirements of the system.

During operation, backup agents 215, 225, and 235 may perform data backups. For example, in one embodiment data may be conveyed to one or more backup data locations and associated metadata conveyed to one or more metabases. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

In order to minimize the size of backup data, single-instance storage techniques may be employed. In a single-instance storage pool, data is stored in segments, with each segment having an identifier or fingerprint that may be used to unambiguously identify it. For example, a data file may be segmented, and a fingerprint calculated for each segment. Duplicate copies of data segments are replaced by a single instance of the segment and a set of references to the segment, one for each copy. To retrieve a backup file, a set of fingerprints corresponding to the file's segments may be used as keys to locate the desired segments. Once the segments have been retrieved, they may be used to re-assemble the desired file.

Figure 3:
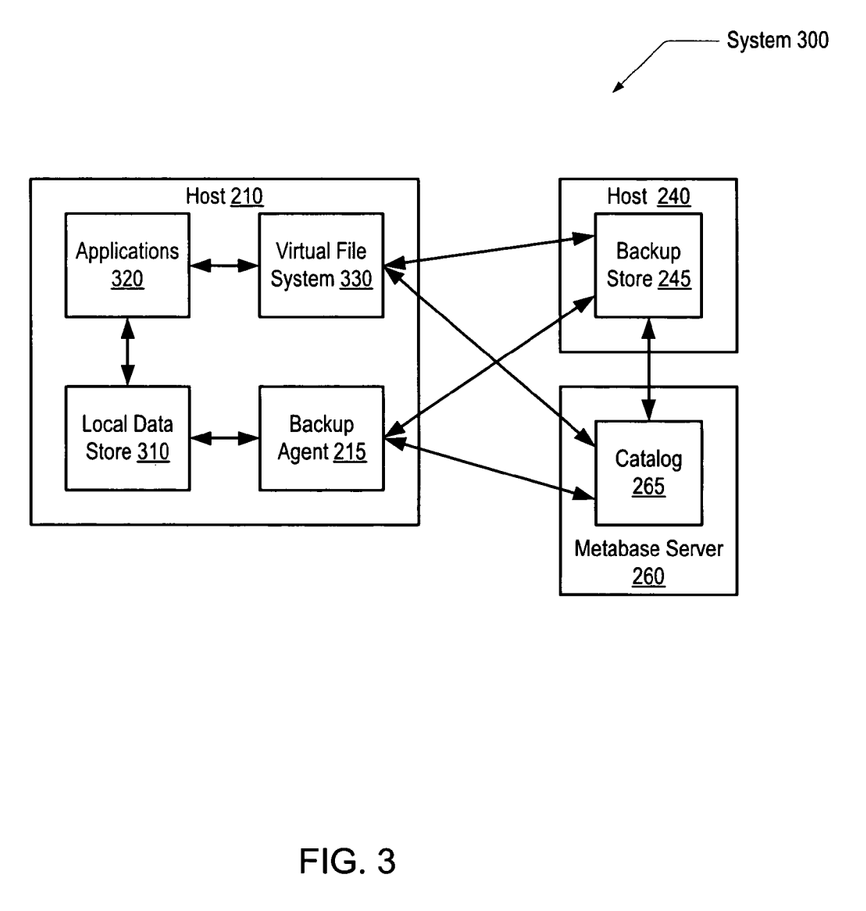
FIG. 3 is a more detailed block diagram of one embodiment of a system that may be a portion of a backup system.

FIG. 3 is a more detailed block diagram of one embodiment of a system 300 that may be a portion of system 200. System 300 includes hosts 210 and 240, and metabase server 260. Host 210 includes a local data store 310, applications 320, a virtual file system 330, and a backup agent 215. Host 240 includes backup store 245. Metabase server 260 includes a catalog 265 in which may be stored metadata describing the data stored in backup store 245. Applications 320 may be any of a variety of conventional applications such as word processing programs, spreadsheets, databases, browsers, etc. Backup agent 215 may backup data from local data store 310 by sending data directly to backup store 245 and associated metadata to catalog 265 using conventional backup techniques. Backup agent 215 may restore data to local data store 310 by retrieving data directly from backup store 245 and associated metadata from catalog 265 using conventional restoration techniques.

In addition to the aforementioned conventional operations of backup agent 215, applications 320 may perform read and write operations on backup data through an interface provided by virtual file system 330. In one embodiment, virtual file system 330 may provide a CIFS/NFS interface. A variety of alternative interfaces may be provided such as a WebDAV interface, pseudo devices interface, etc. Before using this interface from a client host, backup store 245 may be made ready for write access by resolving any queued accesses that may be pending on against it on host 240. For example, access operations may be saved in a journal or log file on host 240. Many common applications require that write access be available to data on which they are to be launched in order to ensure that changes to the data will not be overwritten by or conflict with changes that may be pending in a journal or log file associated with the data. Pending operations may be resolved by replaying the journal or log file prior to granting write access from host 210. Once write access is to backup store 245 is available, it may be mounted, mapped to a drive letter, or otherwise prepared to be used by one or more of applications 320. An application may then be launched on top of backup store 245 through virtual file system 330. To read backup data, virtual file system 330 may present a view of catalog 265, allowing a user or an application to select data entities for retrieval, retrieve the data entities from backup store 245, and store the retrieved data entities in local data store 310. Virtual file system 330 may also allow a user or an application to write backup data, including writing multiple versions of data entities, as though writing to a conventional file system.

Once write access to backup data in backup store 245 is available, a variety of operations may be performed on the backup data. For example, mounting backup store 245 on host 210 through virtual file system 330 and launching one or more applications 320 on top of virtual file system 330 may allow archival backups of data from backup store 245 onto backup media to be performed. Also, an application may perform data verification operations on the data in backup store 245. Before describing the processes through which these actions may be performed, a description of the organization of data and metadata stored in backup store 245 and catalog 265 will first be given.

Figure 4:
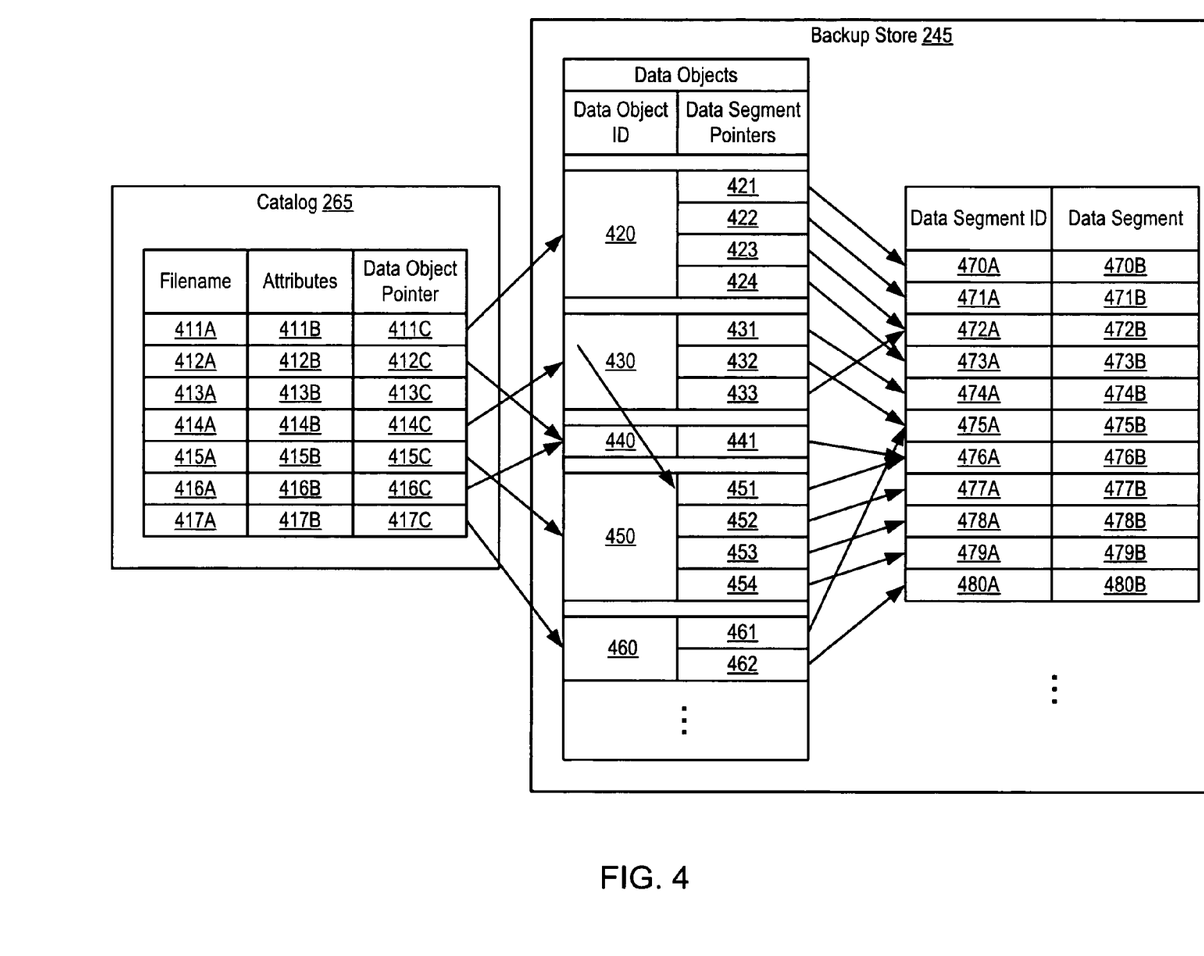
FIG. 4 illustrates one embodiment of a catalog and its associated data in a backup store.

Turning now to FIG. 4, one embodiment of catalog 265 and its associated data in backup store 245 is shown. Catalog 265 may include a database, tables, or other similar data structures. In the illustrated embodiment, catalog 265 includes a table of entries. Each entry includes metadata describing a data entity. A data entity, as used herein, may comprise a portion of a file, one or more files, a container of files such as a folder, or other similar data structures. For ease of understanding, these and other data entities may be referred to as files. Accordingly, each entry may include a filename, a set of attributes, and a data object pointer. More specifically, a first entry includes filename 411A, attributes 411B, and data object pointer 411C, and may be referred to hereinafter as entry 411. Similar filenames, attributes, and data object pointers are shown for entries 412-417.

In one embodiment, filenames such as filename 411A may consist of a user-readable string. However, since multiple files may have the same name, a data object pointer is also stored in each entry to be used as a key to find a corresponding data object in backup store 245. In one embodiment, each data object pointer may be an unambiguous identifier such as a fingerprint. A fingerprint, as used herein, refers to a function of a data entity such as a hash function. In one embodiment, the fingerprints may be encrypted. More particularly, a fingerprint may comprise a Message-Digest algorithm 5 (MD5) or other hash function. Alternative hash functions include Secure Hash Algorithm (SHA), a checksum, signature data, and any other suitable function, cryptographic, or otherwise, for identifying a data entity. Copies of data entities such as files or file segments may be identified by comparing a fingerprint of one entity to the fingerprint of another entity. If the fingerprints match, then the two entities are copies of each other. In addition to the filename and data object pointer, additional attributes such as attributes 411B may be included in a file's metadata. Attributes may include a variety of information describing the associated data such as one or more of: a data size, batch number, type, version number, ownership, permissions, creation time, error code, etc. Other forms of metadata and/or identifiers will be apparent to those of ordinary skill in the art.

In the illustrated embodiment, backup store 245 includes a data object table and a set of data segments. The data object table includes entries, each of which includes a data object ID and a set of associated data segment pointers. More specifically, a first entry includes data object ID 420 and data segment pointers 421-424. Additional entries having data object IDs 430, 440, 450, and 460 are shown. Data object ID 430 is associated with data segment pointers 431-433, data object ID 440 is associated with data segment pointer 441, data object ID 450 is associated with data segment pointers 451-454, and data object ID 460 is associated with data segment pointers 461-462. In one embodiment, each data object ID may be an unambiguous identifier such as a fingerprint. In a further embodiment, each data segment pointer may be an unambiguous identifier such as a fingerprint. Backup store 245 also includes data segments and associated data segment IDs. For example, data segment ID 470A is associated with data segment 470B, 471A with 471B, etc. In one embodiment, each data segment ID may be an unambiguous identifier such as a fingerprint. In a further embodiment, backup store 245 may include single-instance data objects and single-instance data segments, i.e., both data objects and data segments may be de-duplicated.

The relationships among the data object pointers of catalog 265 and the data object IDs, the data segment pointers, and the data segment IDs of backup store 245 may be arranged to permit files and their data segments to be identified, read, written and versioned. More specifically, as shown via connecting arrows in FIG. 4, data object pointer 411C points to data object ID 420, 412C and 416C point to data object ID 440, 413C and 415C point to data object ID 450, 414C points to data object ID 430, and 417C points to data object ID 460. In addition, data segment pointer 421 points to data segment ID 470A, data segment pointer 422 points to data segment ID 471A, data segment pointers 423 and 433 point to data segment ID 472A, etc. Having described the structure and organization of one embodiment of a catalog and a backup data storing data for a backup agent, attention will now turn to reading, writing, versioning, and archiving backup data files.

Figure 5:
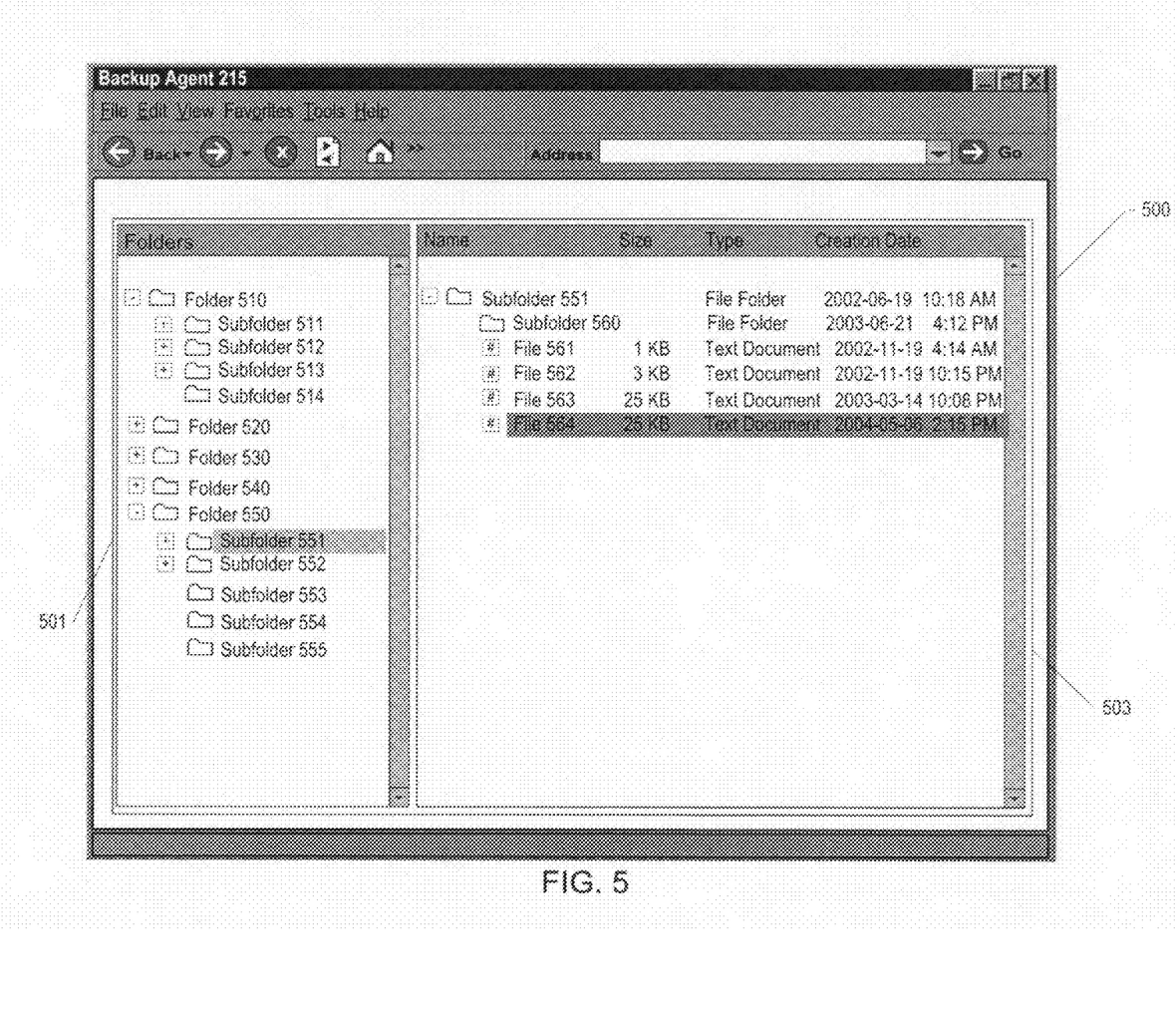
FIG. 5 illustrates one embodiment of a user interface that may be used by backup agent to view backup data and metadata.

FIG. 5 illustrates one embodiment of a user interface 500 that may be used by backup agent 215 to view backup data and metadata. Interface 500 may include features such as drop-down menus, a navigation bar, an address field, and so on. Within the interface 500 are shown two panes, a Folders pane 501 and a Details pane 503. Within the Folders pane, a hierarchy of folders and their associated subfolders may be seen and navigated. The illustrated hierarchy includes folders 510, 520, 530, 540, and 550. Each folder may include one or more sub-folders. For example, folder 510 includes subfolders 511-514 and folder 550 includes subfolders 551-555. As illustrated in FIG. 5, subfolder 551 has been selected as indicated by its highlighted background.

In the Details pane 503, details of the portion of the hierarchy selected in the Folders pane 501 may be listed in rows. Each row may include fields for Name, Size, Type, and Creation date for a particular data entity. For example, subfolder 551 is listed with a Type of "File Folder" and a Creation date of "2002-06-19 10:18 AM." Subfolder 551 includes a subfolder 560, which includes files 561-564. File 564 has been selected as indicated by its highlighted background. It is noted that the naming conventions depicted in FIG. 5 (e.g., "Subfolder 551", "File 564") are provided for ease of discussion. In a typical embodiment, names reflective of those used in ordinary business or other environments (e.g., Accounting, Payroll) may be used.

When a desired data entity is selected in the Folders pane 501, backup agent 215 may send a query to catalog 265 to retrieve the names and attributes of each folder and its included files that are part of the data entity. Conventional file manipulation techniques may be used with data entities within interface 500, such as drag-and-drop, right-click to open a list of actions, etc. A read operation may be performed when a data entity is selected. A write operation may be performed on a selected data entity through a right-click menu, a drag-and-drop action, from a pull-down menu, etc. When a write operation creates a new data entity such as during backup of a newly created folder, backup agent 215 may add an entry to catalog 265 and corresponding data to backup store 245. However, when a write operation modifies a data entity that is already present in catalog 265, such as during backup of a file within an existing folder or revision of an existing file, a different process that will be described with reference to FIG. 6 may be followed.

Figure 6:
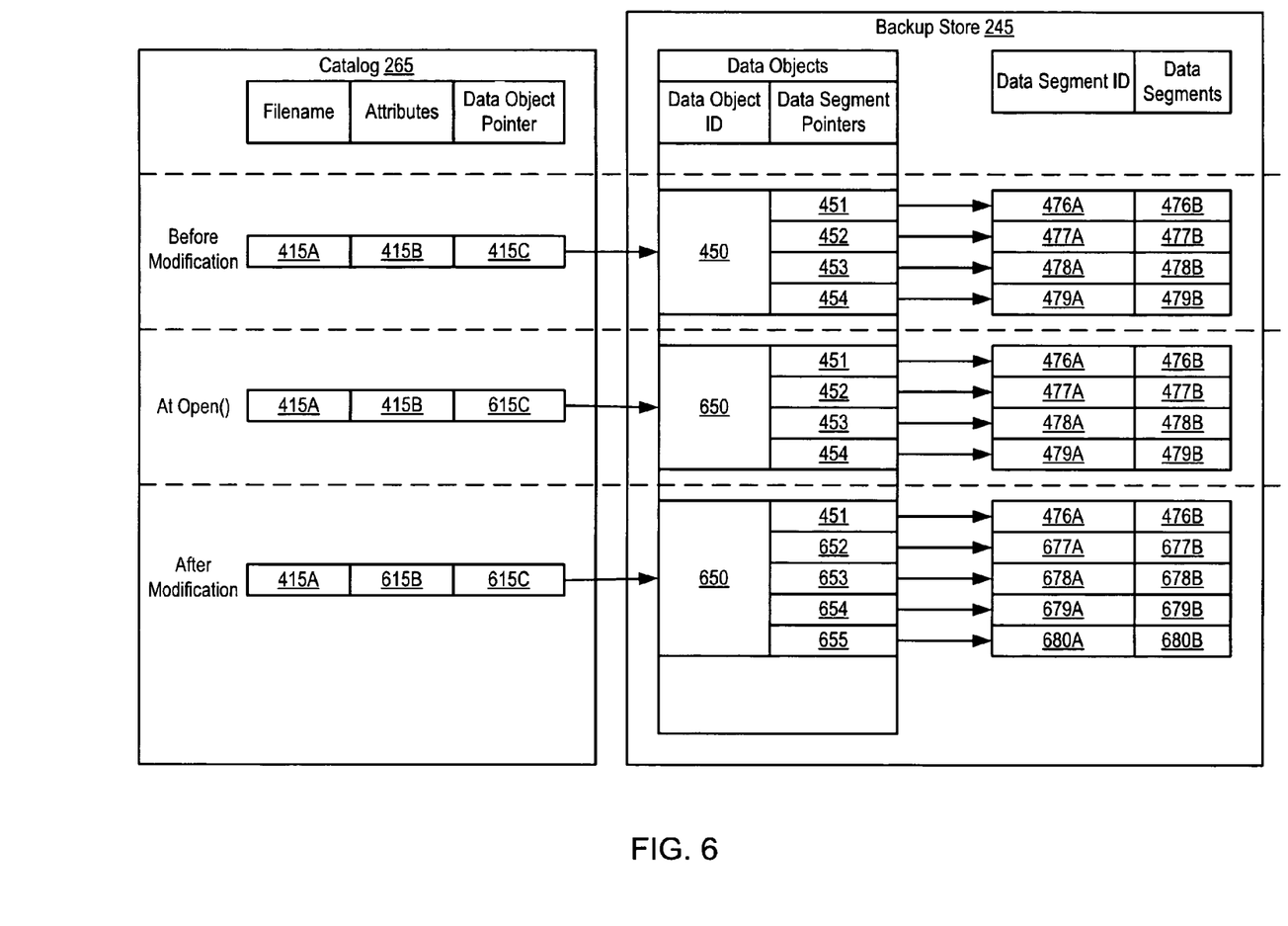
FIG. 6 illustrates one embodiment of modifications made during a write operation to data and metadata corresponding to a data entity that is stored in a backup store.

FIG. 6 illustrates one embodiment of modifications made during a write operation to data and metadata corresponding to a data entity that is stored in backup store 245. In the illustrated embodiment, entry 415 within catalog 265 corresponds to the data entity to be modified. Entry 415 may generally correspond to the entry 415 described in FIG. 4. Prior to the start of the write operation, depicted by the portion of FIG. 6 labeled "Before Modification," entry 415 includes a data object pointer 415C that points to a data object 450 in backup store 245. Data object 450 is associated with data segment pointers 451-454, which point to the data segment IDs of data segments 476-479. When a write operation begins, as shown in the portion of FIG. 6 labeled "At Open( )" a new catalog entry may be created. The new entry's filename and attributes may remain the same, 415A and 415B. However, the new entry may be created with a new data object pointer 615C pointing to a new data object 650 that is created in backup store 245. In one embodiment, the new data object 650 may represent a revised version of the data object 450. The new data object 650 may initially receive the same data segment pointers 451-454 associated with data object ID 450. In addition to creating the new data object, the data entity may be restored in order to be open for editing. More specifically, in one embodiment, a strategy similar to a conventional copy-on-write operation may be employed in which a copy of the data entity is only created if is needed, such as to be archived on a backup medium or modified by a write operation. During a write operation, data segment pointers may be added to and/or removed from the new data object as the data entity is edited. Any portion of the data entity that is deleted may cause one or more corresponding data segment pointers to be removed. Any portion of the data entity that is added may cause one or more corresponding data segment pointers to be added. Existing data segments that are modified may cause corresponding data segment pointers to be replaced by pointers to new data segments that reflect the revisions.

For example, as shown in the portion of FIG. 6 labeled "After Modification," data segment pointers 452-454 have been removed and data segment pointers 652-655 have been added. Data segment pointers 652-655 point to data segments whose IDs are 677A-680A, respectively. Backup agent 215 also sends data segment 677B-680B to backup store 245. Note that data segments 477B-479B are not removed from backup store 245 since they are still pointed to by at least data segment pointers 452-454 associated with data object ID 450. By keeping these data segments in the backup data, an earlier version of the data entity may be preserved, read, and revised further. If backup store 245 is not a single-instance backup store, data segment pointers such as pointer 451 may be replaced with new data segment pointers and copies of corresponding data segments stored in backup store 245. In addition, once the write operation is completed, the restored data entity may be sent to backup store 245 and attributes 415B may be replaced with a new set of attributes 615B. For example, the new attributes 615B may include a new timestamp.

Figure 7:
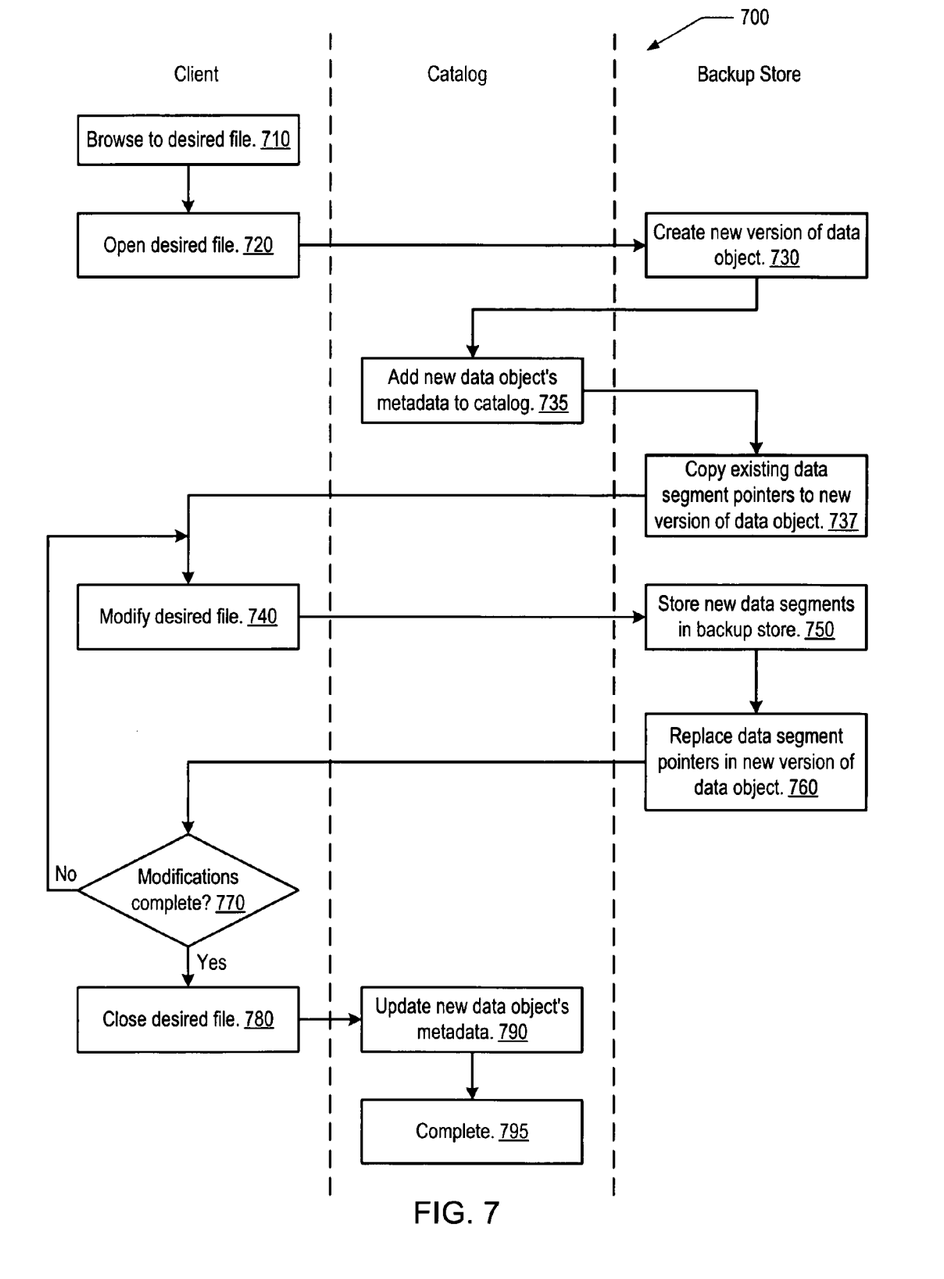
FIG. 7 illustrates one embodiment of a process for modifying a file in a backup store.

FIG. 7 illustrates one embodiment of a process 700 for modifying a file within a backup store. FIG. 7 is divided into three columns labeled "Backup Agent", "Catalog", and "Backup Host," indicating which component of a computer system may execute the corresponding operation in the illustrated embodiment. However, in alternative embodiments, each operation may be executed by a different component, including components not shown in FIG. 7. Process 700 may begin with the identification of a desired file, such as through a browser (block 710). Once a desired file has been identified, it may be opened (block 720) or otherwise made available for access. For example, a copy of the file may be restored from a backup store. When a file is opened, a new version of a corresponding data object may be created in the data object table of the backup store where the identified file's data segments are stored (block 730) and an associated metadata entry may be added to the associated catalog (block 735). The data segment pointers that are associated with the file's data object may be added to the new data object in the backup store's data object table (737). The file may then be modified (block 740). Any new data segments that result from the modification of the file may be stored in the backup store (block 750). Data segment pointers corresponding to the new data segments may be added to and data segment pointers corresponding to portions of the file that are deleted may be removed from the new data object (block 760). The file may remain open and blocks 740, 750, and 760 repeated until modifications are complete (decision block 770). For example, the file may remain open during an editing session. Once modifications are complete, the file may be closed (block 780). When the file is closed, the metadata associated with the new data object may be updated in the associated catalog (block 790), completing process 700 (block 795).

Figure 8:
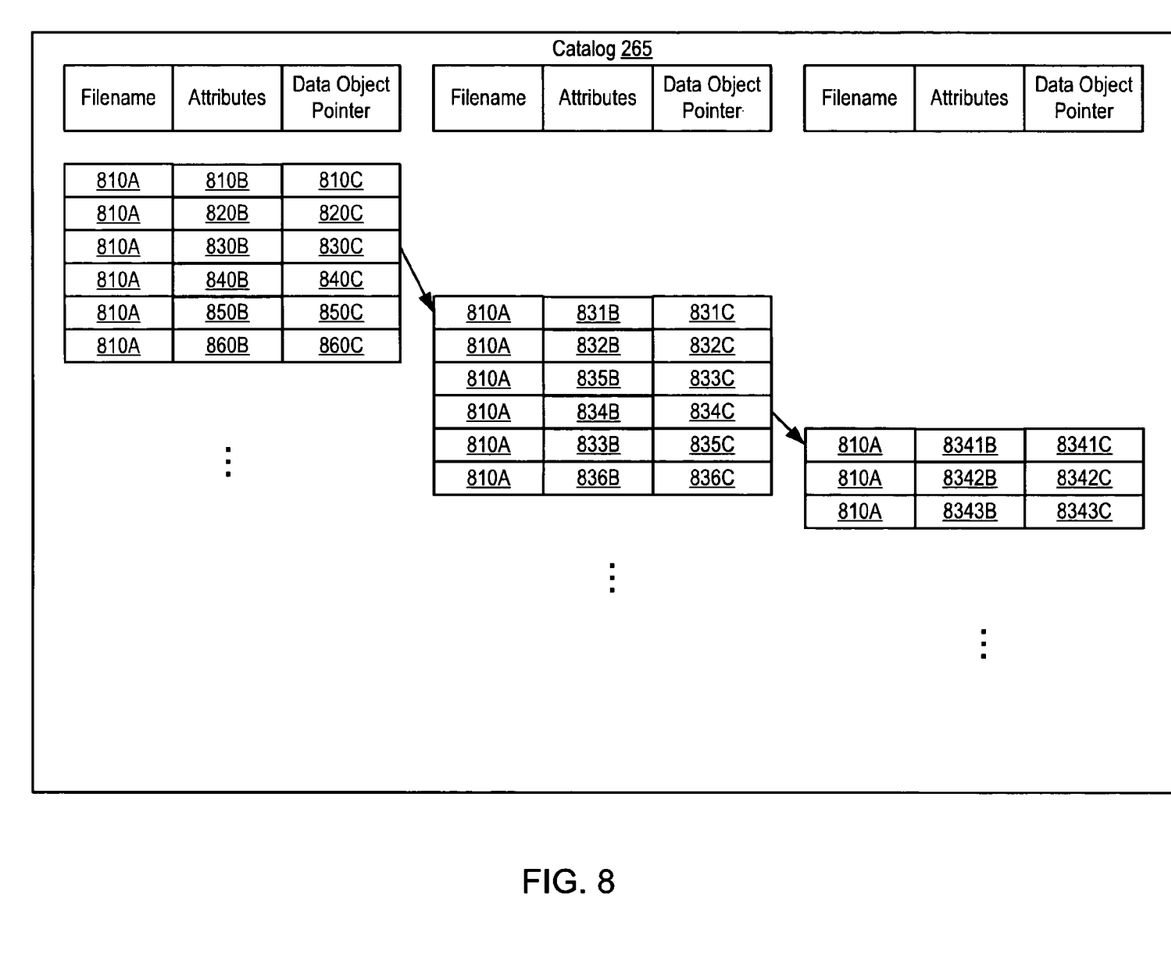
FIG. 8 illustrates one embodiment of catalog metadata corresponding to multiple version of a file.

FIG. 8 illustrates one embodiment of catalog metadata corresponding to multiple versions of a file. In the illustrated embodiment, catalog 265 includes entries corresponding to multiple branches and versions of a file with a filename of 810A. Initially, as shown at the upper left portion of FIG. 8, filename 810A is associated with attributes 810B and data object pointer 810C. Each time the corresponding file is modified, its metadata may change. For example, on the left column of FIG. 8, filename 810A is successively associated with attributes 820B and data object pointer 820C, 830B and data object pointer 830C, 840B and data object pointer 840C, 850B and data object pointer 850C, and 860B and data object pointer 860C. The left column of FIG. 8 may correspond to a first branch of the file. A second branch of the file is shown in the center column and a third branch of the file is shown in the right column of FIG. 8. The second branch may be created from the version of the file whose metadata includes data object pointer 830C as indicated by a connecting arrow. In the second branch, the file may be further modified as indicated by the successive association of filename 810 with attributes 831B and data object pointer 831C, 832B and data object pointer 832C, 833B and data object pointer 833C, 834B and data object pointer 834C, 835B and data object pointer 835C, and 836B and data object pointer 836C. Similarly, the third branch may be created from the version of the file whose metadata includes data object pointer 834C as indicated by a connecting arrow. In the third branch, the file may be further modified as indicated by the successive association of filename 810 with attributes 8341B and data object pointer 8341C, 8342B and data object pointer 8342C, and 8343B and data object pointer 8343C, etc. Similar versioning and branching may be performed for any of the data objects associated with a file, as will be apparent to one of ordinary skill in the art.

Figure 9:
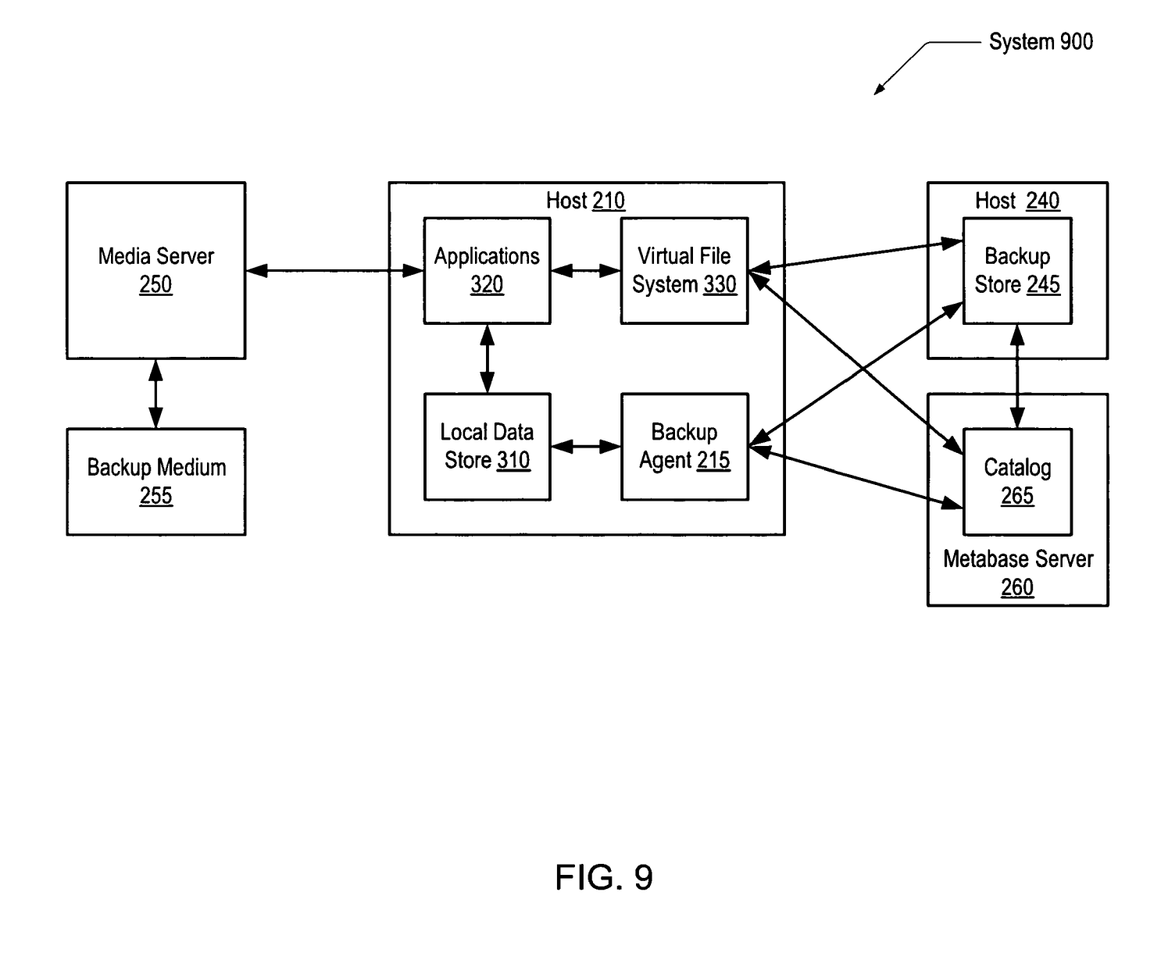
FIG. 9 is a detailed block diagram of one embodiment of a system in which backup data may be moved from a backup store to an archival backup medium.

FIG. 9 is a detailed block diagram of one embodiment of a system 900 in which backup data may be moved from a backup store to an archival backup medium. System 900 includes hosts 210 and 240, and metabase server 260 as previously described regarding FIG. 3 and system 300. System 900 also includes media server 250 coupled to backup medium 255.

During operation, an archival backup of data onto backup medium 255 may be performed from one or more of applications 320. First, writable access to backup data in backup store 245 may be obtained by mounting backup store 245 on host 210 through virtual file system 330. Then, one or more applications 320 may be launched on top of virtual file system 330. Once an application has writable access to backup store 245 and started with the data in the backup store, an archival backup of selected data in backup store 245 may be performed. More specifically, using conventional backup techniques, an application may backup data to backup medium 255 via media server 250 as though the data in backup store 245 were local to the application.

Figure 10:
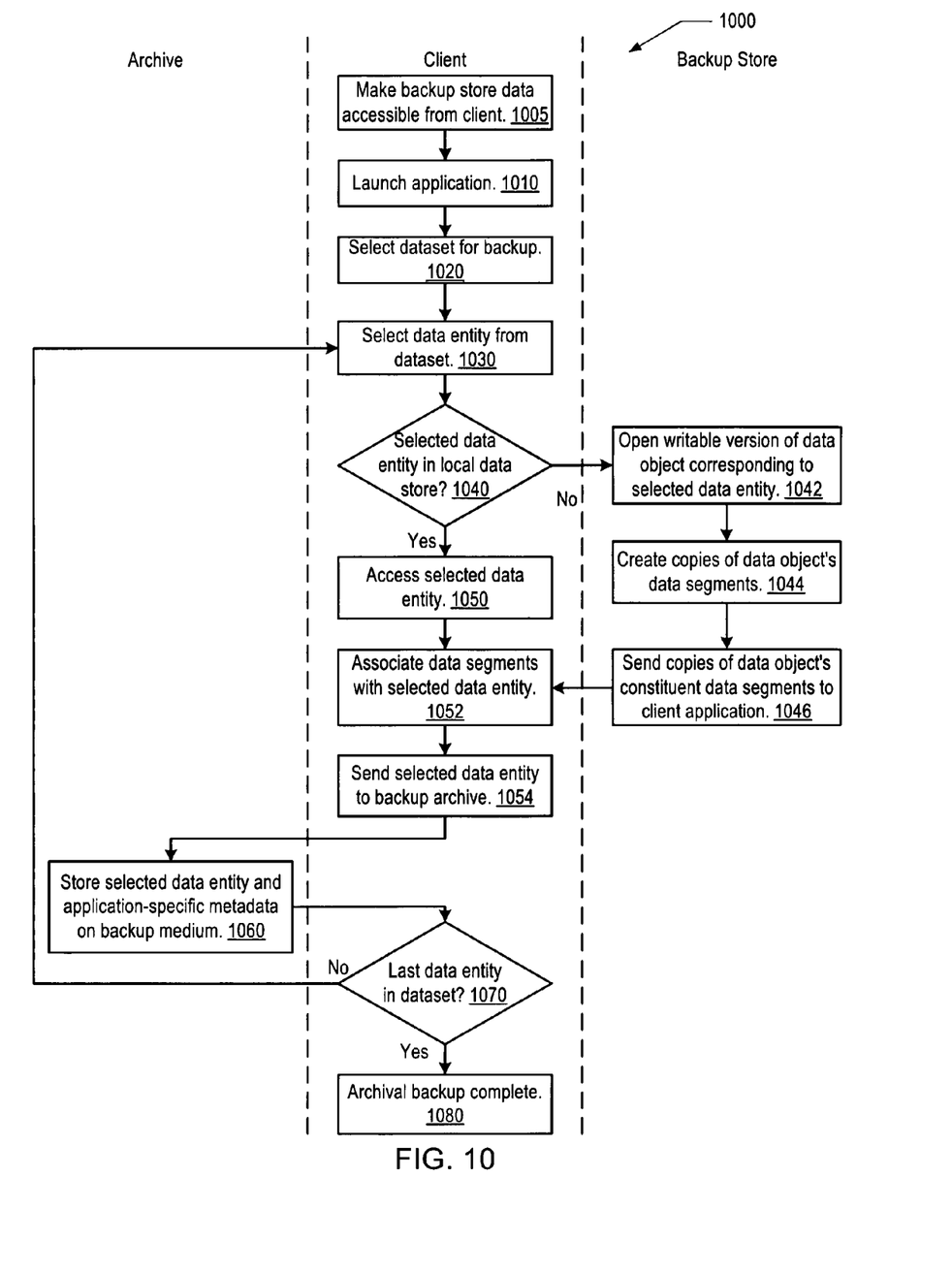
FIG. 10 illustrates one embodiment of a process for moving data from a backup store to a backup archive.

FIG. 10 illustrates one embodiment of a process 1000 for moving data from a backup store to a backup archive. FIG. 10 is divided into three columns labeled "Archive", "Client", and "Backup Store," indicating which component of a computer system may execute the corresponding operation in the illustrated embodiment. However, in alternative embodiments, each operation may be executed by a different component, including components not shown in FIG. 10. Process 1000 may begin with the making data in a backup store accessible on a client host (block 1005). Once the backup store is accessible, an application may be launched on the client host (block 1010), such as one of applications 320 as shown in FIG. 3. For example, an e-mail reader or a database application may be launched. Through the application, a dataset may be selected for backup (block 1020). A data entity from the selected dataset may then be selected (block 1030). If the selected data entity is stored locally (decision block 1040), then the data entity may be accessed conventionally by the application (block 1050). If the selected data entity is not stored locally (decision block 1040), then a writable copy of the data object corresponding to the data entity may be opened (block 1042) via a request to a virtual file system coupled to a backup store, such as virtual file system 330 as shown in FIG. 3. The request may also cause a copy of the data object's constituent data segments to be created (block 1044) similar to the operation illustrated by process 700. Once the data entity's data object has been created, the corresponding data segments may be retrieved from the backup store and sent to the requesting application (block 1046). Data segments accessed locally or retrieved from a backup store may be associated with the selected data entity (block 1052). The resulting data entity and associated application-specific metadata may then be sent to a backup archive (block 1054). Application-specific metadata may include information such as a folder, mailbox, or database table that contains the data entity, a timestamp, filename, permissions, access restrictions, etc that may be used to access the data entity in the context of the application. The backup archive may receive the selected data entity and associated application-specific metadata and store it on a backup medium (block 1060). If the selected data entity is not the last data entity of the selected dataset, process 1000 may return to selecting another data entity from the dataset (block 1030). If the selected data entity is the last data entity of the selected dataset, the archival backup is complete (block 1080).

Although the application described in block 1010 may be the original application from which the selected dataset was conveyed to a backup store, in an alternative embodiment, a different instance of the application may be launched to move data from the backup store to a backup archive. It may be desirable to use a second instance of an application running on the same host as the original application or on a different host from the original application to avoid placing an extra load on a first instance of the application or its host. For example, a dataset that originated from a live email application may be accessed by a second instance of the email application running on a low-traffic host. When the second instance of the application performs an archival backup of a dataset, the application-specific metadata that is stored with the data set may include data identifying the second instance of the application. Such metadata may include the original hostname, logical data path, physical data path, etc. In one embodiment, the application-specific metadata may be modified to identify the original instance of the application and/or the host on which the original instance is running so that the dataset may be retrieved to the original instance of the application.

Figure 11:
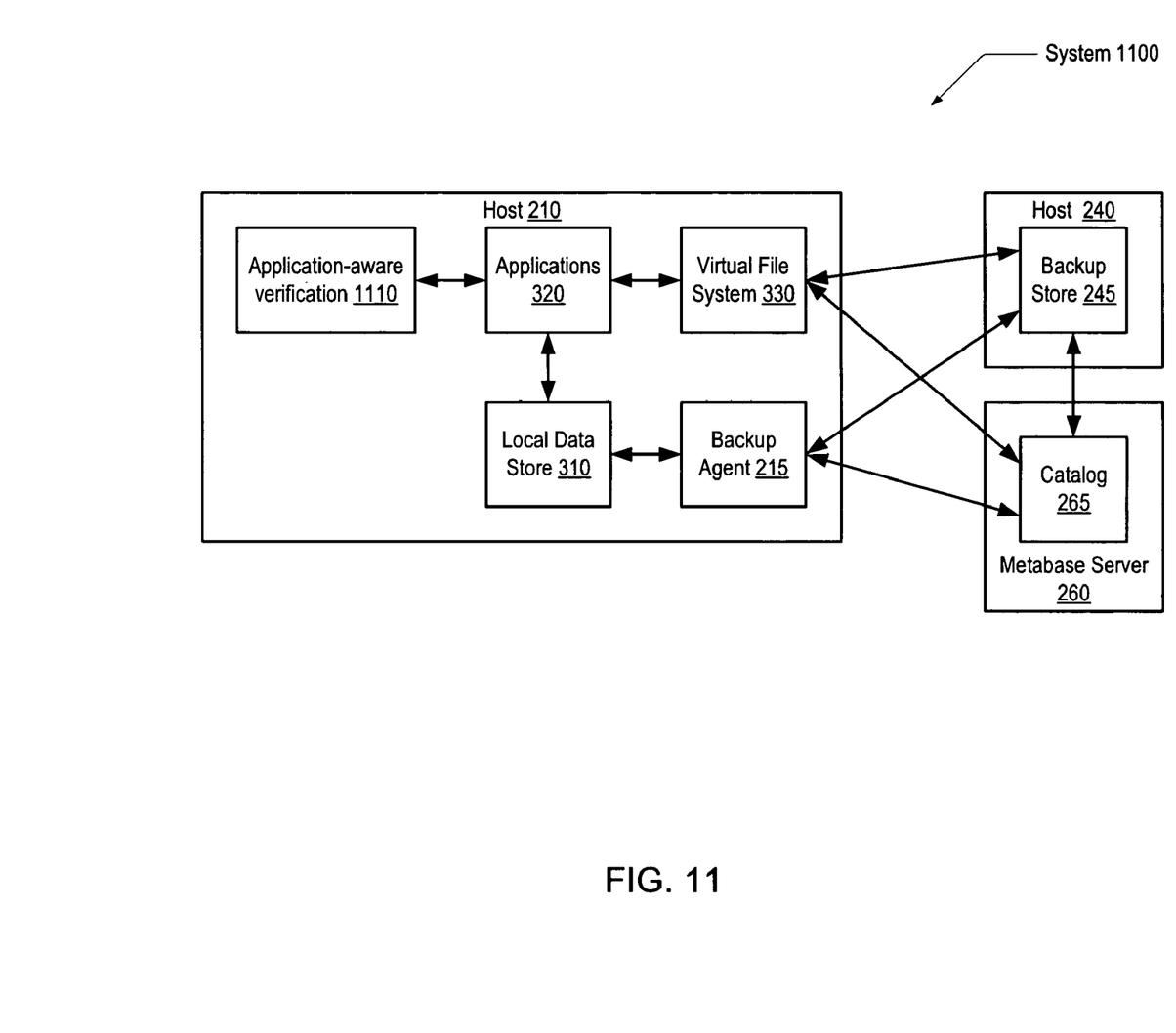
FIG. 11 is a detailed block diagram of one embodiment of a system in which an application may perform data verification operations on the data in a backup store.

FIG. 11 is a detailed block diagram of one embodiment of a system 1100 in which an application may perform data verification operations on the data in a backup store. System 1100 includes hosts 210 and 240, and metabase server 260 as previously described regarding FIG. 3 and system 300. Host 210 includes application-aware verification 1110 as well as local data store 310, applications 320, virtual file system 330, and backup agent 215 as previously described.

During operation, data stored in backup store 245 may be verified by application-aware verification 1110. First, writable access to backup data in backup store 245 may be obtained by mounting backup store 245 on host 210 through virtual file system 330. Then, one or more applications 320 may be launched on top of virtual file system 330. Once an application has writable access to backup store 245, application-aware verification 1110 may verify data in backup store 245. More specifically, using conventional verification techniques, application-aware verification 1110 may execute verification operation on data in backup store 245 a server 250 as though the data were local to the application.

Figure 12:
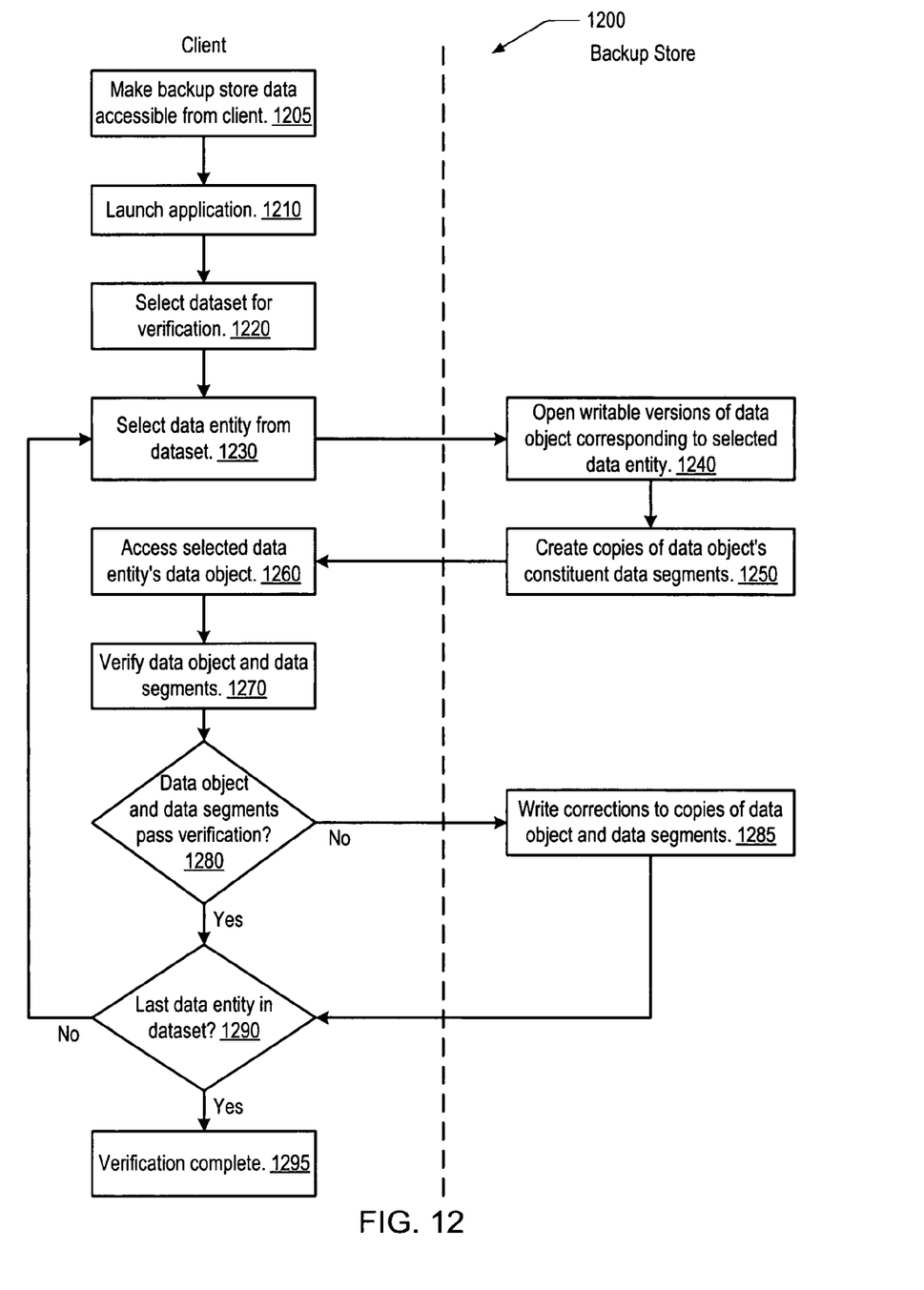
FIG. 12 illustrates one embodiment of a process for verifying data stored in backup store.

FIG. 12 illustrates one embodiment of a process 1200 for verifying data stored in backup store 245. FIG. 12 is divided into two columns labeled "Client" and "Backup Store," indicating which component of a computer system may execute the corresponding operation in the illustrated embodiment. However, in alternative embodiments, each operation may be executed by a different component, including components not shown in FIG. 12. Process 1200 may begin with the making data in a backup store accessible on a client host (block 1205). Once the backup store is accessible, an application may be launched on the client host (block 1210), such as one of applications 320 as shown in FIG. 3. For example, an e-mail reader or a database application may be launched. Through the application, a dataset may be selected for verification (block 1220). A data entity from the selected dataset may then be selected (block 1230). Next, a writable copy of a data object corresponding to the data entity may be opened (block 1240) via a request to a virtual file system coupled to a backup store, such as virtual file system 330 as shown in FIG. 3. The request may also cause a copy of the data object's constituent data segments to be created (block 1250) similar to the operation illustrated by process 700. Once the data entity's data object has been created, the constituent data segments may be accessed by an application-aware verification application (block 1260). The application-aware verification application may then verify the data object and constituent data segments (block 1270). For example, an application-aware verification application may test that a data entity created from the data object and its constituent data segments is usable by an application in the context of the application if they are associated with application-specific metadata. Application-specific metadata may include information such as a folder, mailbox, or database table that contains the data entity, a timestamp, filename, permissions, access restrictions, etc that may be used to access the data entity in the context of the application. If the data from the backup store does not pass verification (decision block 1280), then it may be corrected through the application's write access to the backup store (block 1285). If the data from the backup store passes verification (decision block 1280) and if the selected data entity is not the last data entity of the selected dataset (decision block 1290), process 1200 may return to selecting another data entity from the dataset (block 1230). If the selected data entity is the last data entity of the selected dataset (decision block 1290), then verification is complete (block 1295).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a client computer;
   a host computer coupled to the client and a backup store; and
   a server coupled to the host, the client, and an archival backup medium;
   wherein the host is configured to:
      mount a dataset stored on the client with a first application;
      use the first application to perform a backup operation to backup the dataset to the backup store, wherein the dataset on the backup store is mountable for read/write access; and
      associate the dataset on the backup store with first metadata that identifies the client as an origin of the dataset, wherein the first metadata enables restoration of the dataset to the client directly from the backup store;
   wherein the server is configured to:
      mount the dataset stored on the backup store with a second application different from the first application;
      use the second application to perform a backup operation to create an archival backup of the dataset stored on the backup store, and store the archival backup on an archival backup medium;
      associate the archival backup with second metadata that identifies the backup store as an origin of the dataset; and
      modify the second metadata to identify the client as an origin of the dataset rather than the backup store, wherein the second metadata as modified enables restoration of the archival backup directly from the archival backup medium to the client.

2. The system as recited in claim 1, wherein to modify second metadata, the server is further configured to access and utilize the first metadata to determine particulars regarding how the dataset was originally stored on the client.

3. The system as recited in claim 2, wherein said particulars comprise a hostname of the client, logical data paths of the client, and/or physical data paths of the client.

4. The system as recited in claim 2, wherein the backup store comprises a disk-based backup store and the backup medium is a tape-based backup medium.

5. The system as recited in claim 1, wherein the backup store is further configured to:
   store a plurality of data objects and a plurality of data segments, wherein each data object corresponds to a data entity and references one or more of the plurality of data segments; and
   de-duplicate the one or more data segments against previously stored data segments prior to storing them.

6. The system as recited in claim 1, further comprising a catalog configured to store metadata describing the plurality of data entities; wherein the host is further configured to access the backup store through a virtual file system interface; and wherein the virtual file system interface is configured to use metadata from the catalog to enable the application to write data to data objects in the backup store.

7. The system as recited in claim 6, wherein the application-specific metadata is different from the metadata stored in the catalog.

8. A computer implemented method comprising:
   mounting a dataset stored on a client with a first application;
   utilizing the first application to perform a backup operation to backup the dataset to a backup store, wherein the dataset on the backup store is mountable for read/write access;
   associating the dataset on the backup store with first metadata that identifies the client as an origin of the dataset, wherein the first metadata enables restoration of the dataset to the client directly from the backup store;
   mounting the dataset stored on the backup store with a second application different from the first application;
   utilizing the second application to perform a backup operation to create an archival backup of the dataset stored on the backup store, and store the archival backup on an archival backup medium;
   associating the archival backup with second metadata that identifies the backup store as an origin of the dataset; and
   modifying the second metadata to identify the client as an origin of the dataset rather than the backup store, wherein the second metadata as modified enables restoration of the archival backup directly from the archival backup medium to the client.

9. The method of claim 8, wherein said modifying the second metadata comprising accessing and utilizing the first metadata to determine particulars regarding how the dataset was originally stored on the client.

10. The method of claim 9, wherein said particulars comprise a hostname of the client, logical data paths of the client, and/or physical data paths of the client.

11. The method as recited in claim 9, wherein the backup store comprises a disk-based backup store and the backup medium is a tape-based backup medium.

12. The method of claim 8, wherein the backup store stores a data entity as a data object and one or more data segments, wherein the data object includes references to each of the one or more data segments, the method further comprising the backup store de-duplicating the one or more data segments against previously stored data segments prior to storing them.

13. The method as recited in claim 8, further comprising:
  storing metadata describing the plurality of data entities in a catalog;
  accessing the backup store through a virtual file system interface, wherein the virtual file system interface is configured to use metadata from the catalog to enable the application to write data to data objects in the backup store.

14. The method as recited in claim 13, wherein the application-specific metadata is different from the metadata stored in the catalog.

15. A plurality of computer readable storage media storing computer instructions that are executable by a processor to:
  mount a dataset stored on a client with a first application;
  use the first application to perform a backup operation to backup the dataset to a backup store, wherein the dataset on the backup store is mountable for read/write access;
  associate the dataset on the backup store with first metadata that identifies the client as an origin of the dataset, wherein the first metadata enables restoration of the dataset to the client directly from the backup store;
  mount the dataset stored on the backup store with a second application different from the first application;
  use the second application to perform a backup operation to create an archival backup of the dataset stored on the backup store, and store the archival backup on an archival backup medium;
  associate the archival backup with second metadata that identifies the backup store as an origin of the dataset; and
  modify the second metadata to identify the client as an origin of the dataset rather than the backup store, wherein the second metadata as modified enables restoration of the archival backup directly from the archival backup medium to the client.

16. The computer readable medium as recited in claim 15, wherein to modify the second metadata, the program instructions are further executable to access and utilize the first metadata to determine particulars regarding how the dataset was originally stored on the client.

17. The computer readable medium as recited in claim 16, wherein said particulars comprise a hostname of the client, logical data paths of the client, and/or physical data paths of the client.

18. The computer readable medium as recited in claim 16, wherein the backup store comprises a disk-based backup store and the backup medium is a tape-based backup medium.

19. The computer readable medium as recited in claim 15, wherein the backup store is configured to store a data entity as a data object and one or more data segments, wherein the data object includes references to each of the one or more data segments; and wherein the instructions are further executable to de-duplicate the one or more data segments against previously stored data segments prior to storing them.

20. The computer readable medium as recited in claim 15, wherein the instructions are further executable to:
  store metadata describing the plurality of data entities in a catalog;
  access the backup store through a virtual file system interface, wherein the virtual file system interface is configured to use metadata from the catalog to enable the application to write data to data objects in the backup store.

* * * * *